United States Patent
Iba

(10) Patent No.: US 8,078,321 B2
(45) Date of Patent: Dec. 13, 2011

(54) BEHAVIOR CONTROL SYSTEM

(75) Inventor: Soshi Iba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 12/487,211

(22) Filed: Jun. 18, 2009

(65) Prior Publication Data

US 2009/0326710 A1   Dec. 31, 2009

(30) Foreign Application Priority Data

Jun. 27, 2008  (JP) .................. 2008-169533

(51) Int. Cl.
*G05B 15/00*  (2006.01)
*G05B 19/00*  (2006.01)

(52) U.S. Cl. ........ 700/253; 700/245; 700/247; 700/258; 700/259; 700/264

(58) Field of Classification Search ........................ None
See application file for complete search history.

(56) References Cited

OTHER PUBLICATIONS

"Motion Emergency of Humanoid Robots by Attractor Design of a Nonlinear Dynamics", Masafumi Okada et al., Journal of the Society of Instrument and Control Engineers, vol. 41, No. 6, pp. 533-540 (2005).

*Primary Examiner* — Khoi Tran
*Assistant Examiner* — Bhavesh V Amin
(74) *Attorney, Agent, or Firm* — Rankin, Hill & Clark LLP

(57) ABSTRACT

A behavior control system is capable of causing an agent carry out a task by smooth motions. The behavior control system makes it possible to reproduce a typical shape characteristic of a reference trajectory, i.e., the characteristic of a motion of an instructor carrying out a task, by using a first model defined on the basis of a plurality of reference trajectories representing the position of a first state variable in a time-series manner. Further, a learning trajectory representing the position of a second state variable in a time-series manner is generated on the basis of a second model, which represents an agent's motion in which the position of the second state variable corresponding to the first state variable and one or a plurality of time differential values (a displacing velocity and acceleration) thereof continuously change, in addition to the first model.

8 Claims, 12 Drawing Sheets

② FILL NODES IN REVERSE
DIRECTION FROM P (N)

① FILL NODES IN FORWARD DIRECTION FROM P (0)

P (0)
P (N)

ATTRACTOR POINT
POSITION TRAJECTORY

② FILL NODES IN REVERSE
DIRECTION FROM P (N)

P (N)

ESTIMATED TRAJECTORY $Q_i$

P (0)

③ GENERATE LEARNING TRAJECTORY

BEHAVIOR CONTROL SYSTEM

BACKGROUND OF THE INVENTION

1. Field of the Invention

The present invention relates to a system for causing an agent to carry out a task by emulating a behavior of an instructor carrying out the task.

2. Description of the Related Art

A polynomial, Bezier or attractor or the like has been used as a technique to generate a trajectory of a state variable of an agent suited to an actual situation on the basis of a reference state variable trajectory. For example, it has been reported that a stable autonomous motion of a humanoid robot acting as an agent is achieved by designing an attractor in the state space of a dynamical system and a state variable trajectory of the robot being entrained by the attractor (refer to "Motion Emergence of Humanoid robots by an Attractor Design of Nonlinear Dynamics" by Masashi Okada, Kenta Osato, and Yoshihiko Nakamura in Journal of the Society of Instrument and Control Engineers, vol. 41, No. 6, pp 533-540 (2005)).

However, when an agent acts under a restricting condition that the agent maintains the contour characteristics of motions of an instructor, there is a possibility of impairing smoothness of motions of the agent. This causes awkward motions of the agent for carrying out a task, leading to a possibility of difficulties in accomplishing the task as smoothly as the instructor does.

SUMMARY OF THE INVENTION

An object of the present invention is to provide a system capable of causing an agent to perform a task by a smooth motion.

A behavior control system according to a first aspect of the invention is a system for causing an agent to carry out a task by emulating a behavior taken by an instructor to carry out the task, the behavior control system including: a trajectory generating element which generates a learning trajectory indicative of the position of a second state variable in a time-series manner on the basis of a first model which represents a typical shape characteristic of a reference trajectory indicating, in a time-series manner, the position of a first state variable which is displaced with the motion of the instructor, and a second model which represents a motion of the agent in which the position and one or a plurality of n-th order time differential values (n=1, 2, . . . ) of a second state variable corresponding to the first state variable continuously change, wherein the motion of the agent is controlled according to the learning trajectory generated by the trajectory generating element.

According to the behavior control system in accordance with the first aspect of the invention, a learning trajectory indicating the position of the second state variable in a time-series manner is generated according to the first model and the second model.

The first model represents a typical shape characteristic of a reference trajectory which indicates, in a time-series manner, the position of the first state variable which is displaced with the motion of the instructor. Thus, a learning trajectory is generated according to the first model, making it possible to impart a typical shape characteristic of a reference trajectory, i.e., the characteristic of a motion of the instructor carrying a task, to a learning trajectory.

The second model represents a motion of the agent in which the position and one or a plurality of n-th order time differential values (n=1, 2, . . . ) of the second state variable corresponding to the first state variable continuously change. Thus, the learning trajectory is generated according to the second model, making it possible to impart a displacement characteristic, in which the position and one or a plurality of n-th order time differential values of the second state variable continuously change, to a learning trajectory.

Hence, the behavior of the agent is controlled according to a learning trajectory, thus enabling the agent to carry out a task by a smooth motion which does not cause discontinuity in the time differential values of the second state variable while causing the agent to emulate or reproduce a motion characteristic of the instructor.

The term "state variable" is a concept that includes scalars and vectors and also a concept that includes probability distribution variables. The term "position" of a state variable means a position in a space defined by the state variable.

A behavior control system according to a second aspect of the invention is characterized in that the trajectory generating element generates an estimated trajectory which indicates the estimated position of the second state variable at each point according to the first model and the second model, sets a permissible passing range of the position of the second state variable at each point on the basis of the estimated trajectory, and generates the learning trajectory such that the position of the second state variable at each point falls within the permissible passing range at the each point in the behavior control system according to the first aspect of the invention.

According to the behavior control system in accordance with the second aspect of the invention, an estimated trajectory indicating a time-series change manner of the estimated position of the second state variable at each point is generated. The estimated trajectory is generated according to the first model and the second model. Therefore, the estimated trajectory combines a typical shape characteristic of a reference trajectory and a displacement characteristic in which the position and one or a plurality of n-th order time differential values of the second state variable continuously change. Furthermore, the learning trajectory is generated such that the position of the second state variable at each point falls within the permissible passing range, i.e., such that a certain level of fluctuation or stagger defined by the breadth of the permissible passing range is allowed. This arrangement makes it possible to provide a learning trajectory with a displacement characteristic of the position of the second state variable which is continuous to an extent required for a smooth motion of the agent under a condition that the learning trajectory be provided with a typical shape characteristic of a reference trajectory to an extent required to carry out a task.

A behavior control system according to a third aspect of the invention is characterized in that the trajectory generating element sets the permissible passing range such that the permissible passing range of the position of the second state variable at a reference point having higher need for tracking the reference trajectory to cause the agent to perform the task is set to be narrower or smaller in the behavior control system according to the second aspect of the invention.

According to the behavior control system in accordance with the third aspect of the invention, the breadth or the magnitude of the permissible passing range is set in order to cause the agent to carry out a task, thus making it possible to generate an appropriate learning trajectory for the agent to carry out the task while reflecting a motion characteristic of the instructor thereon.

According to a behavior control system in accordance with a fourth aspect of the invention, in the behavior control system according to the second aspect of the invention, the trajectory generating element estimates the position of the second state variable at each point in the forward direction in a time-series manner thereby to generate the estimated trajectory in the forward direction, estimates the position of the second state variable at each point in the reverse direction in a time-series manner thereby to generate the estimated trajectory in the reverse direction, and generates the learning trajectory such that the value of the second state variable at each point falls within a resultant permissible passing range obtained by combining the permissible passing range of the estimated trajectory in the forward direction and the permissible passing range of the estimated trajectory in the reverse direction.

According to the behavior control system in accordance with the fourth aspect of the invention, the estimated trajectory in the forward direction not only has a typical shape characteristic of a reference trajectory but also a displacement characteristic, in which the position and one or a plurality of n-th order time differential values of the second state variable continuously change, in the forward direction in a time-series manner. The estimated trajectory in the reverse direction not only has a typical shape characteristic of a reference trajectory but also a displacement characteristic, in which the position and one or a plurality of n-th order time differential values of the second state variable continuously change, in the reverse direction in a time-series manner. Further, the learning trajectory is generated such that the position of the second state variable at each point falls within a resultant permissible passing range obtained by combining the permissible passing range of the estimated trajectory in the forward direction and the permissible passing range of the estimated trajectory in the reverse direction, i.e., such that a certain level of fluctuation or stagger defined by the breadth of the resultant permissible passing range is allowed.

This arrangement makes it possible to provide a learning trajectory with a displacement characteristic of the position of the second state variable which is continuous to an extent required to achieve a smooth motion of the agent under a condition that the learning trajectory be provided with a typical shape characteristic of a reference trajectory in each of the forward direction and the reverse direction in a time-series manner to an extent required to carry out a task.

According to a behavior control system in accordance with a fifth aspect of the invention, in the behavior control system in accordance with the first aspect of the invention, the trajectory generating element defines the first model such that the properties of the first model change along the way.

The behavior control system in accordance with the fifth aspect of the invention permits the adjustment of the balance between a typical shape characteristic of the reference trajectory and the displacement characteristic of the position of a continuous second state variable of the learning trajectory in the behavior control system according to the first aspect of the invention. This enables the agent to carry out a task by achieving smoothly connected behaviors having different properties, such as different levels of tracking the reference trajectory required of the position of the second state variable.

A behavior control system according to a sixth aspect of the invention includes a state recognizing element which recognizes a reference trajectory indicating the position of the first state variable in a time-series manner, wherein the trajectory generating element defines the first model on the basis of a plurality of the reference trajectories recognized by the state recognizing element each time the instructor carries out the task, in the behavior control system according to the first aspect of the invention.

According to the behavior control system in accordance with the sixth aspect of the invention, each time the instructor carries out the task a plurality of times, the reference trajectory indicating the position of the first state variable in a time-series manner is recognized or measured. This makes it possible to generate the first model which is appropriate to be used as the basis on which a typical shape characteristic of a reference trajectory, i.e., the characteristic of a motion of the instructor carrying out the task is reproduced or emulated on the basis of a plurality of reference trajectories.

A behavior control system according to a seventh aspect of the invention is characterized in that the trajectory generating element defines an attractor on the basis of the reference trajectory and defines the first model indicating a typical shape of the reference trajectory on the basis of the attractor in the behavior control system according to the first aspect of the invention.

The behavior control system according to the seventh aspect of the invention makes it possible to generate a learning trajectory such that a specified point on the learning trajectory is attracted to an attracting point of the attractor corresponding to the specified point, such as a start point, an end point, or a characteristic midpoint, on the reference trajectory. This arrangement makes it possible to provide a learning trajectory with a typical shape characteristic of a reference trajectory to an extent required to carry out a task under a condition that the learning trajectory be provided with a displacement characteristic of the position of the second state variable which is continuous to an extent required for a smooth motion of the agent to be achieved.

A behavior control system according to an eighth aspect of the invention is characterized in that the trajectory generating element displaces the attracting point of the attractor according to the progress of carrying out the task in the behavior control system according to the seventh aspect of the invention.

The behavior control system according to the eighth aspect of the invention allows fluctuation or displacement of the attracting point of the attractor. This arrangement makes it possible to provide a learning trajectory with a displacement characteristic of the position of the second state variable which is continuous to an extent required for a smooth motion of the agent to be accomplished under a condition that the learning trajectory be provided with a typical shape characteristic of a reference trajectory to an extent required to carry out a task.

DESCRIPTION OF THE PREFERRED EMBODIMENTS

The following will describe embodiments of a behavior control system in accordance with the present invention with reference to the accompanying drawings.

Figure 1:
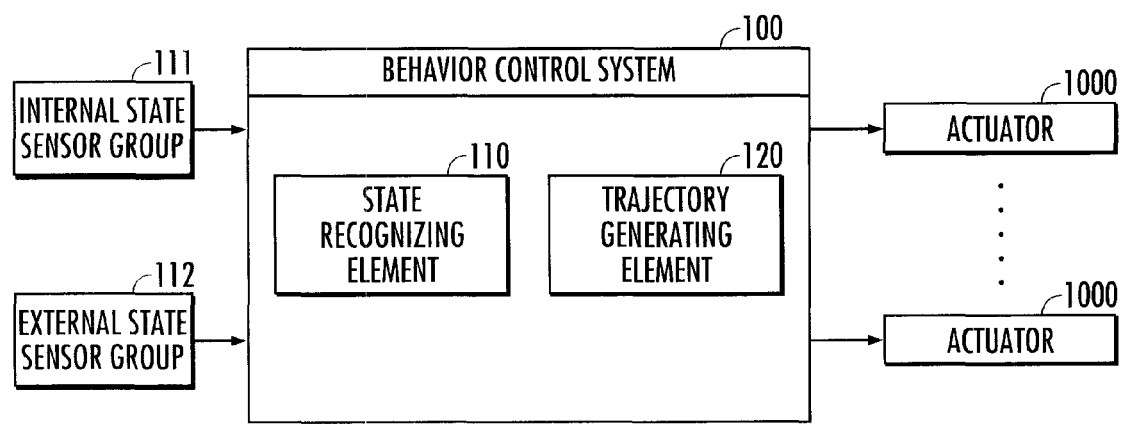
FIG. 1 is a block diagram of a behavior control system in accordance with the present invention.
Figure 2:
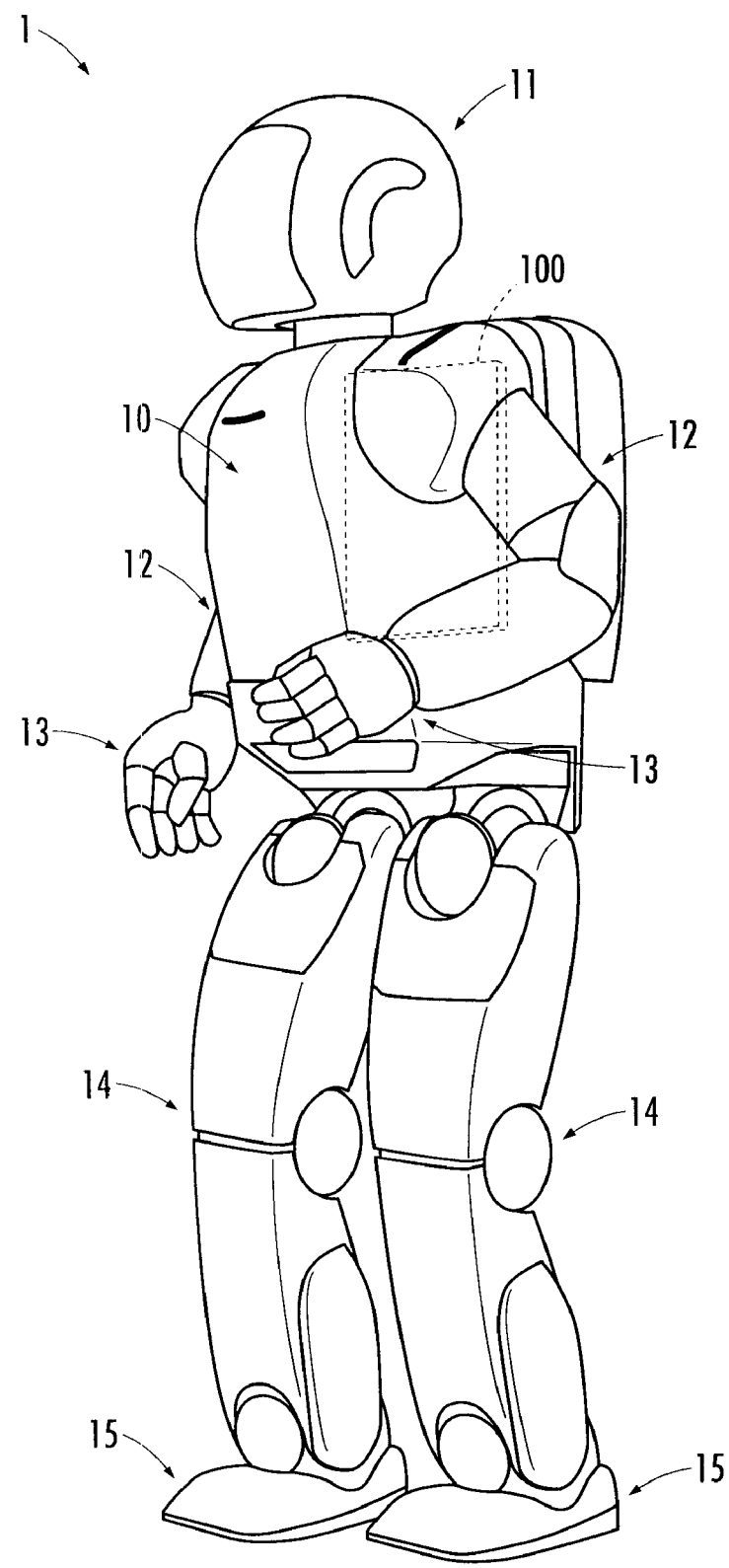
FIG. 2 is a graphical illustration of the construction of a robot as an agent.

First, the construction of the behavior control system will be described. A behavior control system 100 shown in FIG. 1 controls the behaviors of a robot 1 by controlling the operation of an actuator group 1000 mounted on the robot 1 acting as an agent illustrated in FIG. 2.

The robot 1 is a legged mobile robot and provided with a body 10, a head 11 mounted on the top of the body 10, right and left arms 12 extended from the right and left sides of an upper portion of the body 10, hands 13 provided at the distal ends of the arms 12, right and left legs 14 extended downward from the bottom of the body 10, and feet 15 attached to the distal ends of the legs 14, as with a human being. As disclosed in Published Japanese Translation of PCT Application 03-090978 or Published Japanese Translation of PCT Application 03-090979, the robot 1 is capable of bending and stretching the arms 12 and the legs 14 at a plurality of joint mechanisms corresponding to a plurality of joints, such as shoulder joints, knee joints, carpal joints, hip joints, and foot joints, of a human being by using forces transmitted from the actuator group 1000. Each of the arms 12 has a first arm link connected to the body 10 through the intermediary of a shoulder joint mechanism and a second arm link having one end thereof connected to an end of the first link through the intermediary of an elbow joint mechanism and the other end thereof connected to the root of the hand 13 through the intermediary of the carpal joint. Each of the legs 14 has a first leg link connected to the body 10 through the intermediary of a hip joint mechanism and a second leg link having one end connected to an end of the first link through the intermediary of a knee joint mechanism while the other end connected to the foot 15 through the intermediary of a foot joint. The robot 1 is capable of autonomously moving by repeatedly leaving and landing the right and left legs 14 from and onto a floor.

The behavior control system 100 is constructed of an electronic control unit, which is constituted primarily of a CPU, a ROM, a RAM, and an I/O circuit, or a computer mounted in the robot 1.

The behavior control system 100 has a state recognizing element 110 and a trajectory generating element 120.

The state recognizing element 110 recognizes the values of a variety of state variables on the basis of output signals from an internal state sensor group 111 and an external state sensor group 112. The internal state sensor group 111 includes, for example, a GPS measuring instrument for measuring the position (the position of the center of gravity) of the robot 1 or an acceleration sensor, a gyro sensor for measuring the posture of the body 10, and rotary encoders for measuring the bending angles or the like of joint mechanisms. The external state sensor group 112 includes, for example, a motion capture system (not shown), which is separate from and independent of the robot 1, a stereo image sensor mounted on the head 11 to measure the positional trajectory of an object, such as a ball, related to the execution of a task, and an active sensor using infrared light mounted on the body 10. The state recognizing element 110 recognizes a reference trajectory indicating the position of a first state variable, which is displaced as an instructor moves, in a time-series manner.

The trajectory generating element 120 defines a first model indicating a typical shape of reference trajectories on the basis of a plurality of reference trajectories recognized by the state recognizing element 110 each time the instructor carries out a task. The trajectory generating element 120 generates a learning trajectory indicating, in a time-series manner, the position of a second state variable which is associated with the first state variable and which is displaced according to a motion of the robot 1 acting as an agent on the basis of the first model and a second model which represents a motion of the robot 1 in which one or a plurality of n-th order time differential values (n=1, 2, . . . ) of the second state variable corresponding to the first state variable continuously changes. The behavior control system 100 controls the operation of the actuator group 1000 such that the robot 1 behaves according to the learning trajectory generated by the trajectory generating element 120.

The devices constituting the present invention are physically constructed of memories, such as ROMs and RAMs, and arithmetic processors (CPUs) which read programs from the memories and execute arithmetic processing for which they are responsible. The programs may be installed in computers through the intermediary of software recording media, such as CDs and DVDs, or may be downloaded into the computers by servers via networks or artificial satellites in response to request signals transmitted from the robot 1 to the servers.

When a constituent device in the present invention "recognizes" information, it means that the constituent device executes every information processing required for the preparation to subject the information to further arithmetic processing. Such information processing includes, for example, searching information from a database, reading information from a storage, such as a memory, measuring, calculating, estimating or judging information on the basis of basic information retrieved, received, read or the like or on the basis of output signals of sensors or the like, and storing information which has been measured or the like. Some constituent devices, such as the state recognizing element 110 and the trajectory generating element 120, of the behavior control system 100 may be constructed of an external computer of the robot 1, and the rest, such as a device for controlling the behaviors of the robot 1, may be constructed of a computer capable of receiving calculation results from the external computer in a wireless or wired manner.

The functions of the behavior control system 100 having the aforesaid construction will be described.

Figure 4:
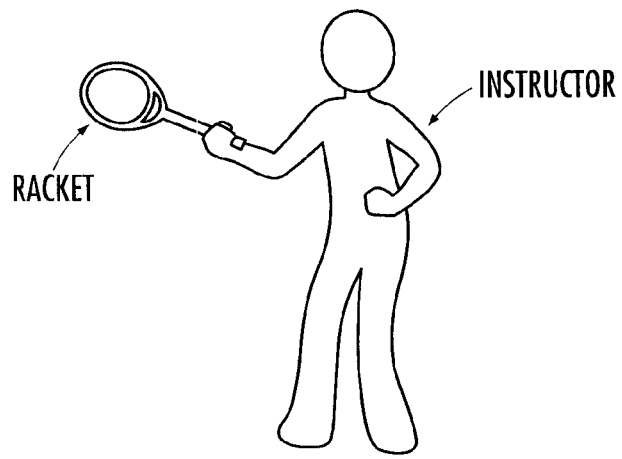
FIG. 4(a) to FIG. 4(c) are graphical illustrations of motions of an instructor in a first embodiment.
Figure 4:
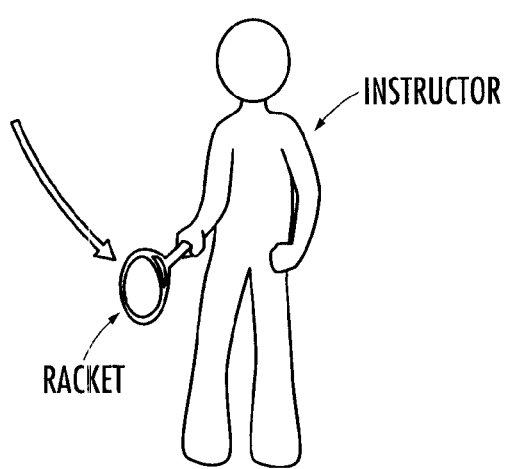
Figure 4:
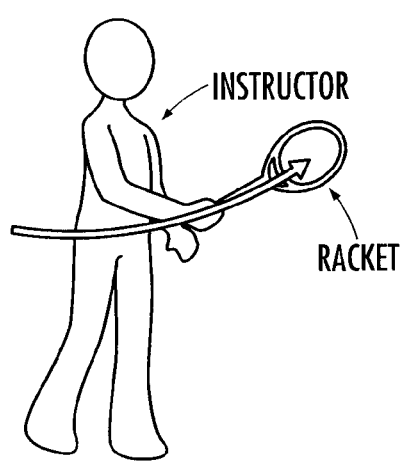

First, the behavior control system 100 according to a first embodiment of the present invention will be described. The behavior control system 100 according to the first embodiment controls the behaviors of the robot 1 acting as an agent so as to cause the robot 1 to emulate the behaviors of a human being, who acts as an instructor carrying out a task of swinging a racket held in his/her one hand, as illustrated in FIG. 4(a) to FIG. 4(c) in sequence, thereby causing the robot 1 to perform the same task, as illustrated in FIG. 5(a) to FIG. 5(c). FIGS. 4(a), 4(b), and 4(c) illustrate a state immediately before the instructor begins to move the racket, a state in which the instructor is moving the racket, and a state in which the instructor has stopped moving the racket, respectively.

Figure 3:
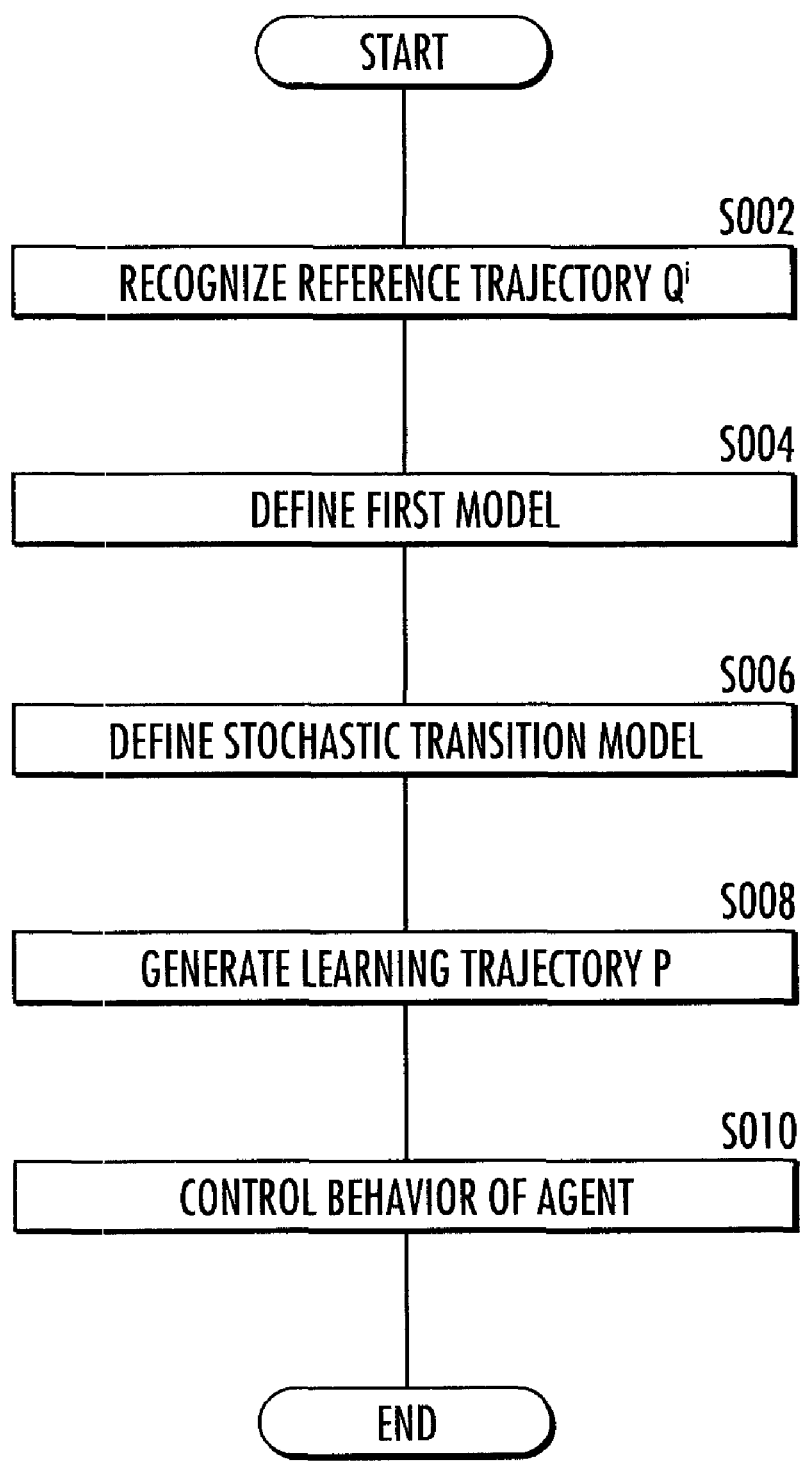
FIG. 3 is a flowchart illustrating a method for generating a trajectory of the robot and controlling the behaviors thereof.

First, each time the instructor repeats the task, the state recognizing element 110 recognizes a reference trajectory indicating the position of the first state variable in a time-series manner (S002 in FIG. 3).

More specifically, the position of the racket (the position of the top thereof) is measured as the first state variable. Instead of or in addition to the position of the racket, the position of a specified location, such as a hand, an elbow, a shoulder or a knee, of the instructor (including the racket or the like attached to the instructor) may be measured as the first state variable, or the displacing velocity or the acceleration or the like of a characteristic part may be measured as the first state variable. Further alternatively, the angle, the angular velocity or the angular acceleration of a specified joint of the instructor, such as a shoulder joint, an elbow joint, a carpal joint and a knee joint, may be measured as the first state variable. Further alternatively, an arbitrary combination of the position, the displacing velocity and the acceleration of a specified location and the angle, the angular velocity and the angular acceleration of a specified joint may be recognized as the first state variable. Thus, a reference trajectory $Q_i=[q_i(0), \ldots q_i(k), \ldots q_i(N)]$ ($i=1, 2, \ldots, X$) is recognized. The "$q_i(k)$" means the position of the first state variable at a point k on an i-th reference trajectory $Q_i$ and the "$q_i(k)$" is represented in a scalar or vector form. The position of the racket measured as the first state variable is defined in a three-dimensional state variable space, so that the position of the first state variable is defined in a three-dimensional space. The shape characteristic of the reference trajectory $Q_i$ is substantially the same as the shape characteristics of the trajectories of the racket positions indicated by the arrows in FIGS. 4(b) and 4(c).

If the position of a hand is measured in addition to the position of the racket as the first state variable, then the position of the first state variable is defined in a six-dimensional space. If the positions of two specified locations are measured as the first state variable and x-components of the two specified locations share a substantially constant relationship, then the x-component of one specified location may be omitted by being renormalized into the x-component of the other specified location, so that the position of the first state variable may be defined in a five-dimensional space.

The position of the first state variable is measured by an optical motion capture system used as the external state sensor group 112. The optical motion capture system measures the racket position on the basis of the results of detection of a mark attached to a specified location of the racket or the like, the detection results being provided by one or a plurality of cameras, i.e., trackers, disposed around the instructor.

Alternatively, the position of the first state variable may be measured by a mechanical, magnetic or inertial motion capture system. A mechanical motion capture system measures the position of the first state variable on the basis of output signals indicative of the angles of joints of the instructor received from supporters attached to the instructor or a plurality of potentiometers attached to a suit. A magnetic motion capture system measures the position of the first state variable on the basis of output signals from the supporters attached to the instructor or a plurality of magnetic sensors attached to the supporters or the suit. An inertial motion capture system measures the position of the first state variable on the basis of output signals indicative of the inertial moments of arms or the like from the supporters attached to the instructor or a plurality of inertial moment sensors attached to the supporters or the suit.

Subsequently, the trajectory generating element 120 defines the first model on the basis of the reference trajectory $Q_i$ recognized by the state recognizing element 110 (S004 in FIG. 3).

To be specific, first, based on the reference trajectory $Q_i$, an attractor matrix R is calculated according to a relational expression (10). The calculation method of the attractor matrix is described in, for example, "Trajectory Representation Using Sequenced Linear Dynamical Systems, K. R. Dixon and P. K. Khosla, Proceeding of the IEEE International Conference on Robotics and Automation (2004). If the first model is set and stored in a storage device beforehand, then the state recognition by the state recognizing element 110 may be omitted and the data or information representing the first model may be read from the storage device by the trajectory generating element 120.

$$R=(Q^\smallfrown(k+1)-Q^\smallfrown(k))(Q^\smallfrown(k)-Q^\smallfrown(N))^+, \; Q^\smallfrown(k)\equiv[q_1(1)\ldots q_1(N\_1-1)\ldots q_i(1)\ldots q_i(N\_i-1)\ldots q_x(1)\ldots q_x(N\_x-1)], \; Q^\smallfrown(k+1)\equiv[q_1(2)\ldots q_1(N\_1)\ldots q_i(2)\ldots q_i(N\_i)\ldots q_x(2)\ldots q_x(N\_x)], \; Q^\smallfrown(N)\equiv[q_1(N\_1)\ldots q_1(N\_1)\ldots q_i(N\_i)\ldots q_i(N\_i)\ldots q_x(N\_x)\ldots q_x(N\_x)] \quad (10)$$

Here, "+" denotes a pseudo inverse matrix and "N_i" denotes the trajectory length of an i-th trajectory. Then, the first model represented by relational expressions (11) and (12) is defined using the attractor matrix R.

$$v(k)=Rp(k)-Ru(k)+N(\mu_v,\Sigma_v) \quad (11)$$

$$u(k+1)=u(k)+\epsilon(k)+N(\mu_u,\Sigma_u) \quad (12)$$

Relational expression (11) indicates that the level of a displacing velocity v (k) of the position of the second state variable at a point k is determined on the basis of the attractor matrix R and the magnitude of the error of a position p (k) of the second state variable based on an attracting point u (k) at the point k of the attractor, and that the displacing velocity v (k) of the position of the second state variable is a continuous random variable having a fluctuation or an uncertainty denoted by a probability distribution (generally a Gaussian distribution) N ($\mu_v, \Sigma_v$) ($\mu_v=0, \Sigma_v$ covariance matrix). In other words, the level of the displacing velocity v (k) and the degree of the fluctuation of the second state variable at the point k are determined according to the first model.

Relational expression (12) indicates that the attracting point u (k) of the attractor is allowed to be displaced by a displacement amount $\epsilon$ (k) and that the attracting point u (k) is a continuous random variable having an uncertainty denoted by a probability distribution N ($\mu_u, \Sigma_u$) ($\mu_u=0, \Sigma_u$: covariance matrix). In relational expression (12), the second term of the right side of relational expression (12) may be omitted.

Further, a stochastic transition model is defined on the basis of the first model and the second model represented by relational expressions (21) to (23) stored in a memory (S006 in FIG. 3). The second model represents motions of the robot 1 in which the position p of the second state variable corresponding to the first state variable and each of a first-order time differential value (displacing velocity v=dp/dt) and a second-order time differential value (acceleration $\alpha=d^2p/dt^2$) thereof smoothly or continuously change.

In place of the second model representing the motions of the robot 1 in which the position p of the second state variable and each of the first-order time differential value and the second-order time differential value thereof continuously change, a second model may be adopted which represents the motions of the robot 1 in which the position p of the second state variable and one or a plurality of n-th order time differential values continuously change. Such second model includes, for example, the one that represents the motions of the robot 1 in which the position p of the second state variable and the first-order time differential value thereof or the second-order time differential value thereof and a third-order time differential value thereof continuously change. The second state variable corresponds to the first state variable and means the position of a specified location, such as the position of the racket held by the hand 13.

If an arbitrary combination of the position of a specified location and the time differential value thereof and the angle of a characteristic function and the time differential value thereof is measured as the first state variable described above, then the arbitrary combination of the position of the specified location of the robot 1 and the time differential value thereof and the angle of the characteristic function and the time differential value thereof is defined as the second state variable.

$$p(k+1)=p(k)+v(k+1)+N(\mu_p,\Sigma_p) \quad (21)$$

$$v(k+1)=v(k)+\alpha(k+1)+N(\mu_v,\Sigma_v) \quad (22)$$

$$\alpha(k+1)=\alpha(k)+\beta(k+1)+N(\mu_\alpha,\Sigma_\alpha) \quad (23)$$

Relational expression (21) represents one aspect of the second model in which the position p (k) of the second state variable smoothly changes and that the position p (k) is a continuous random variable having an uncertainty denoted by a probability distribution N ($\mu_p$, $\Sigma_p$) ($\mu_p$=0, $\Sigma_p$: covariance matrix).

Further, relational expression (22) represents one aspect of the second model in which the displacing velocity of the position (the first-order time differential value of the position) v (k) of the second state variable smoothly changes and that the displacing velocity v (k) is a continuous random variable having an uncertainty denoted by a probability distribution N ($\mu_v$, $\Sigma_v$) ($\mu_v$=0, $\Sigma_v$: covariance matrix).

Further, relational expression (23) represents one aspect of the second model in which the displacing acceleration of the position (the second-order time differential value of the position) α (k) of the second state variable smoothly changes and that the displacing acceleration α (k) is a continuous random variable having an uncertainty denoted by a probability distribution N ($\mu_\alpha$, $\Sigma_\alpha$) ($\mu_\alpha$=0, $\Sigma_\alpha$: covariance matrix). Here, β (k) denotes the jerk of the position (the third-order time differential value of the position (=$d^3p/dt^3$)) of the second state variable. In relational expression (23), the second term of the right side may be omitted.

Figure 6:
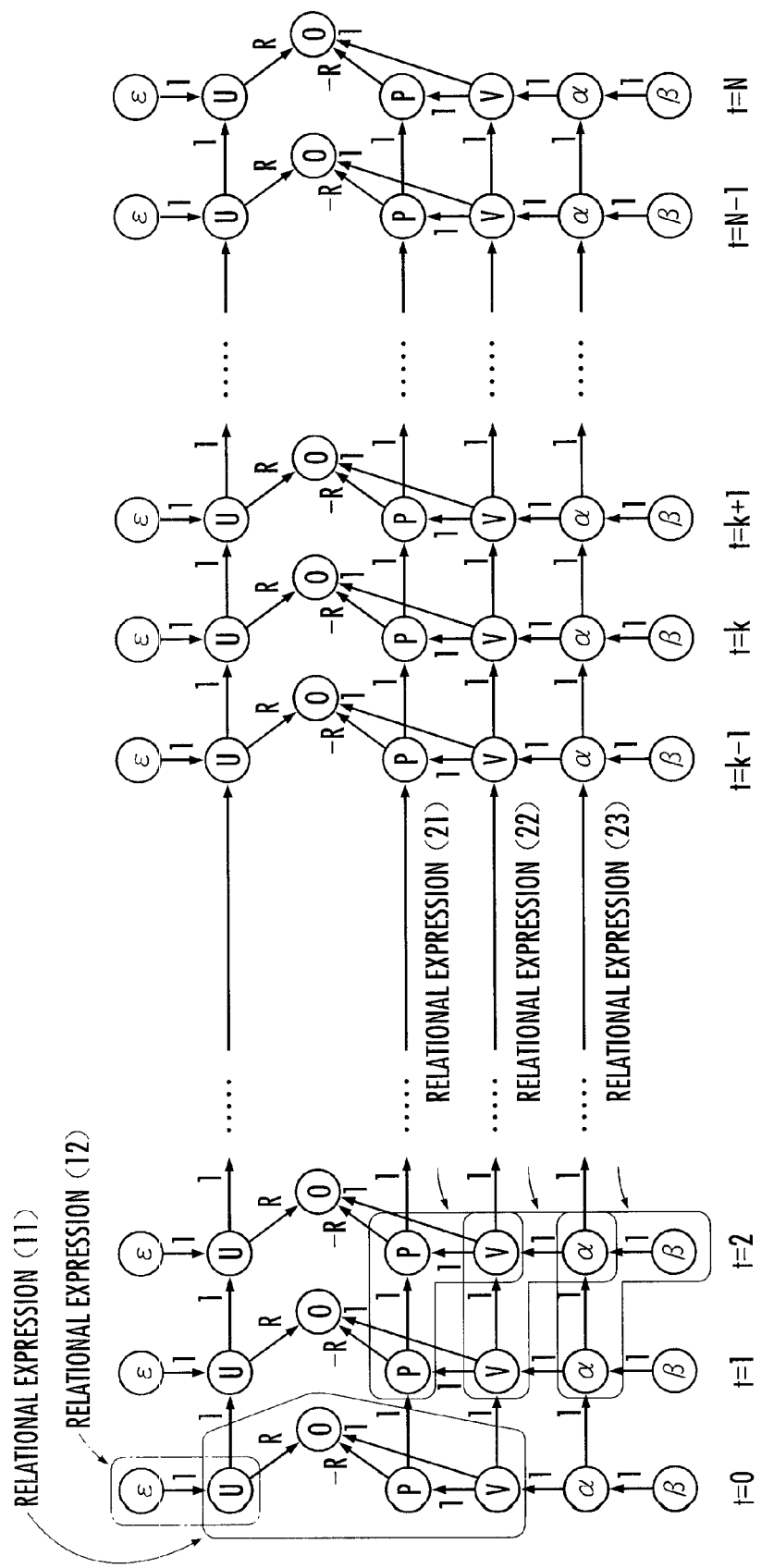
FIG. 6 is a graphical illustration of a stochastic transition model (DBN)

The stochastic transition model is expressed by dynamic Bayesian networks (DBN) illustrated in FIG. 6. According to the DBN, relational expressions (11), (12), and (21) to (23) are represented by nodes (circles) denoting the position p of the second state variable, the attracting point u, and the like at each point t, and arrows connecting them on the basis of conditional probabilities. Further, the conditional probabilities corresponding to relational expressions (11), (12), and (21) to (23), respectively, are represented by relational expressions (111), (112), and (122) to (123), respectively.

$$P(0|v(k),p(k),u(k))=N(v(k)-Rp(k)+Ru(k),0)=N(0,0) \quad (111)$$

$$P(u(k+1)|u(k),\epsilon(k))=N(u(k)+\epsilon(k),\Sigma_u) \quad (112)$$

$$P(p(k+1)|p(k),v(k+1))=N(p(k)+v(k+1),\Sigma_p) \quad (121)$$

$$P(v(k+1)|v(k),\alpha(k))=N(v(k)+\alpha(k+1),\Sigma_v) \quad (122)$$

$$P(\alpha(k+1)|\alpha(k),\beta(k))=N(\alpha((k)+\beta(k+1),\Sigma_a) \quad (123)$$

The state variable node ε in relational expression (112) is represented by relational expression (212). The state variable node β in relational expression (123) is represented by relational expression (223).

$$P(\epsilon(k))=N(0,\Sigma_\epsilon) \quad (212)$$

$$P(\beta(k))=N(0,\Sigma_\beta) \quad (223)$$

Subsequently, a learning trajectory is generated according to the stochastic transition model (S008 in FIG. 3). To be specific, in the DBN given in FIG. 6, the position p, the velocity v, the acceleration α, and the jerk β of the second state variable are set at a first reference point t=0 and a second reference point t=N, respectively, as described above.

Figure 5:
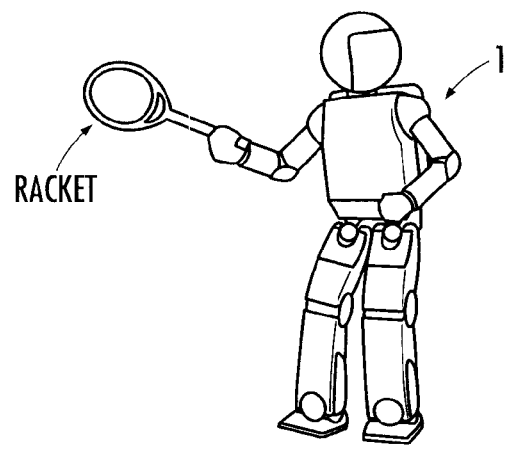
FIG. 5(a) to FIG. 5(c) are graphical illustrations of motions of the robot in the first embodiment.
Figure 5:
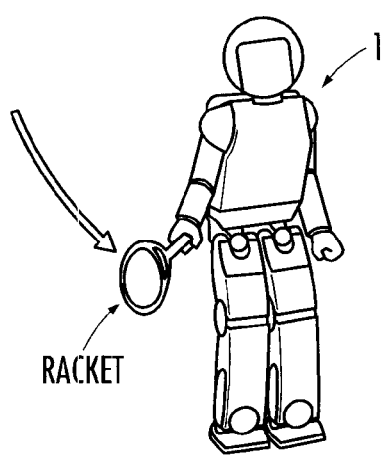
Figure 5:
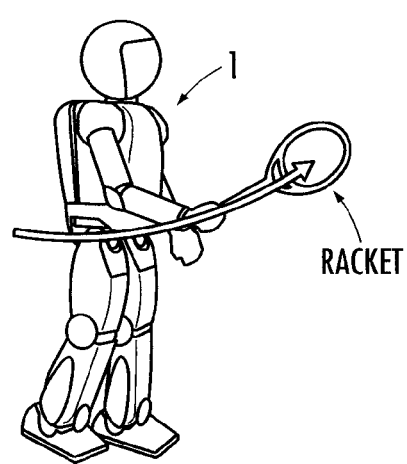

For example, the position (the start point of the learning trajectory) p (0) of the second state variable is set at the point (t=0) at which the robot 1 begins to move the racket, as illustrated in FIG. 5(*a*). To be specific, the racket position when the robot 1 is still holding the racket (or getting ready) is set as the position p (0) of the second state variable at the first reference point t=0. The displacing velocity v (0), the acceleration α (0), and the jerk β (0) of the position p (0) of the second state variable at the first reference point t=0 are all set to zero.

Further, a target position of the racket when the robot 1 stops moving the racket as illustrated in FIG. 5(*c*) is set as the position p (N) of the second state variable at the second reference point t=N. The position p (N) of the second state variable at the second reference point t=N may alternatively be set in a range in the vicinity of the attracting point u (0) of the attractor at the first reference point t=0. The velocity v (N), the acceleration α (N), and the jerk β (N) of the second state variable at the second reference point t=N are all set to zero.

Further, the nodes from the first reference point t=0 to the second reference point t=N are sequentially estimated in the forward direction (in the direction from a front point toward a rear point) in a time-series manner according to the stochastic transition models represented by relational expressions (11), (12), and (21) to (23). Thus, the estimated trajectory in the forward direction, which indicates the changing manner of the estimated position of the second state variable in the forward direction in the time series, is generated.

Similarly, the nodes from the second reference point t=N to the first reference point t=0 are sequentially estimated in the reverse direction (in the direction from the rear point toward the front point) in a time-series manner according to the stochastic transition models. Thus, the estimated trajectory in the reverse direction, which indicates the changing manner of the estimated position of the second state variable for the reverse direction in a time-series manner, is generated. Further, a permissible passing range which expands using the estimated trajectory in the forward direction as the reference is set, and a permissible passing range which expands using the estimated trajectory in the reverse direction as the reference is set.

Then, a resultant permissible passing range is set by combining the two permissible passing ranges, and a learning trajectory P is generated such that the position p (k) of the second state variable at each point falls within the resultant permissible passing range.

As the method for estimating nodes in the DBN, Loopy Belief Propagation, Variable Elimination, Junction Tree, Importance Sampling, Hugin Algorithm, Shafer-Shenoy Algorithm, Variational Message Passing, Gibbs Sampling or the like may be employed in addition to the method described above, which is called Belief Propagation.

For easier understanding of the method for generating the learning trajectory P, a situation will be considered in which the position p (k) of the second state variable is one-dimensional (scalar) and estimated according to a relational expression of p(k+1)=Ap(k) (A=1.50).

In the situation, it is assumed that a measurement position p (0) of the second state variable at the first reference point t=0 is 1.00 and a target position p (3) of the second state variable at the second reference point t=3 is 5.00. In this case, the trajectory that goes through $p^+(0)(=p(0))$, $p^+(1)(=Ap(0))$, $p^+(2)(=A^2p(0))$, and $p^+(3)(=A^3p(0))$ in order is generated as the estimated trajectory in the forward direction.

Figure 7:
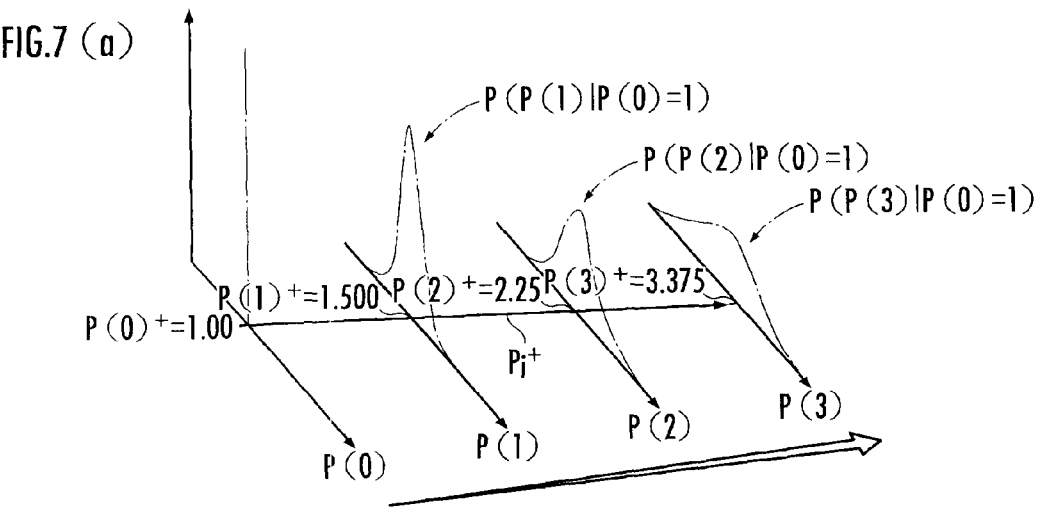
FIG. 7(a) to FIG. 7(c) are graphical illustrations of a method for filling nodes in the stochastic transition model.
Figure 7:
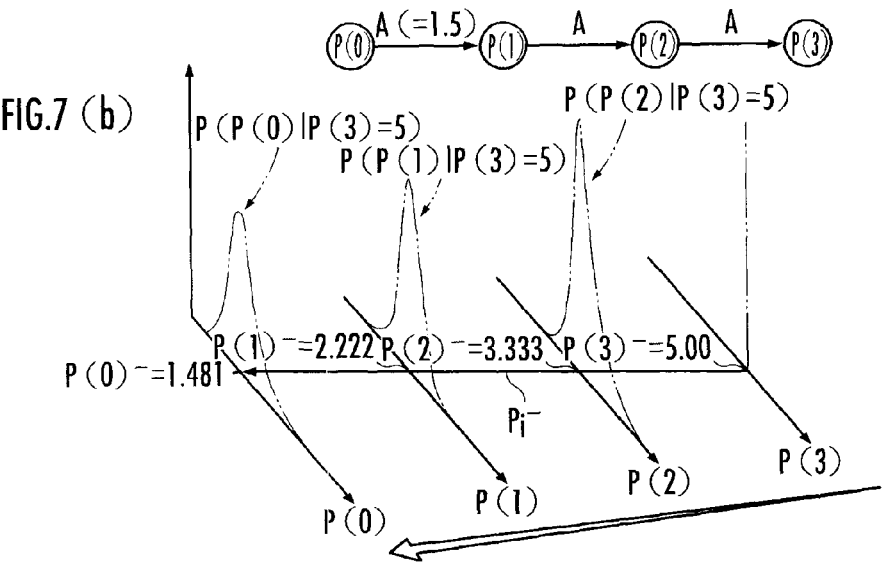
Figure 7:
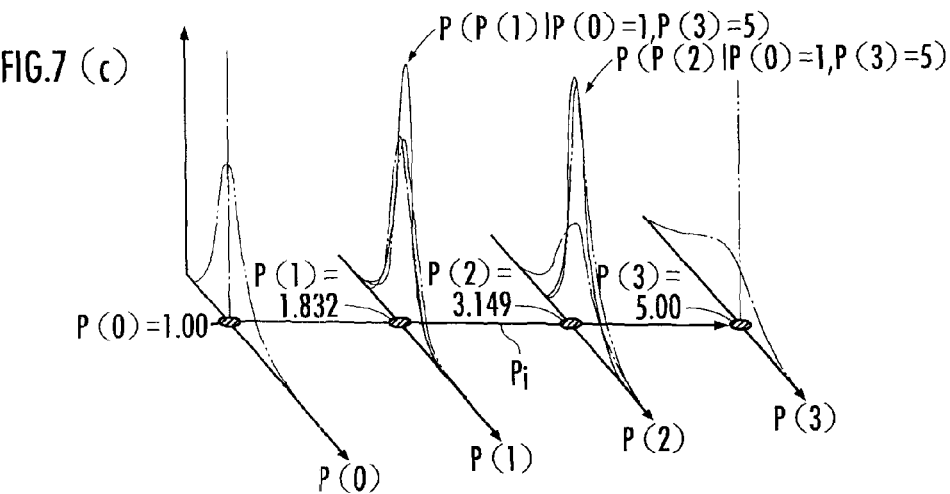

Then, as illustrated in FIG. 7(a), a conditional probability distribution (indicated by the chain line) $P(p^+(k)|p(0)=1.00)$ (k=1, 2, 3) of an estimated position $p^+(k)$ of the second state variable at each point in the forward direction in a time-series manner is calculated as a permissible passing range at each point which expands, using the estimated trajectory in the forward direction as the reference thereof.

On the other hand, a trajectory that goes through $p^-(3)(=p(3))$, $p^-(2)(=A^{-1}p(0))$, $p^{-1}(1)(=A^{-2}p(0))$, and $p^-(0)(=A^{-3}p(0))$ in order is generated as the estimated trajectory in the reverse direction.

Then, as illustrated in FIG. 7(b), a conditional probability distribution indicated by the chain line $P(p^-(k)|p(3)=5.00)$ (k=2, 1, 0) of an estimated position $p^-(k)$ of the second state variable at each point in the reverse direction in a time series manner is calculated as a permissible passing range at each point, which permissible passing range expands, using the estimated trajectory in the reverse direction as the reference thereof.

Then, these two conditional probability distributions are combined to calculate a conditional probability distribution $P(p(k)|p(0)=1.00, p(3)=5.00)$ (k=1, 2) as the resultant permissible passing range. Thus, as illustrated in FIG. 7(c), the trajectory that goes through p(0)=1.00, p(1)=1.842, p(2)=3.149, and p(3)=5.00, each of which indicates the maximum conditional probability at each point k, in order is generated as the learning trajectory P.

Figure 8:
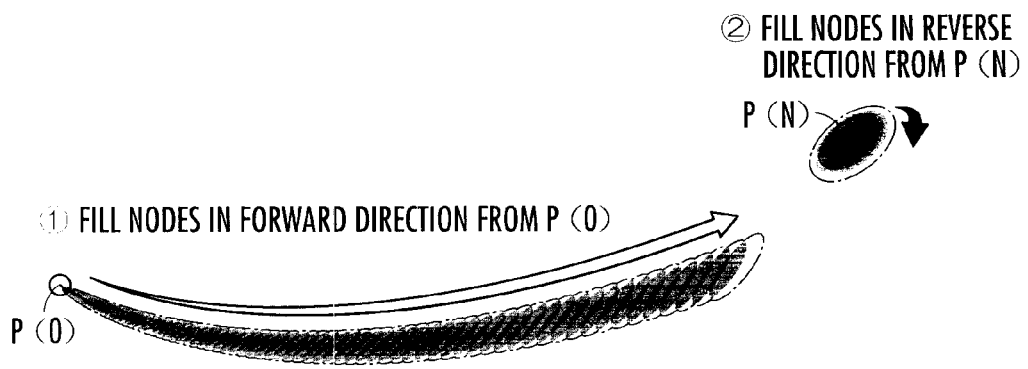
FIG. 8(a) and FIG. 8(b) are graphical illustrations of a method for generating a learning trajectory in the first embodiment.
Figure 8:
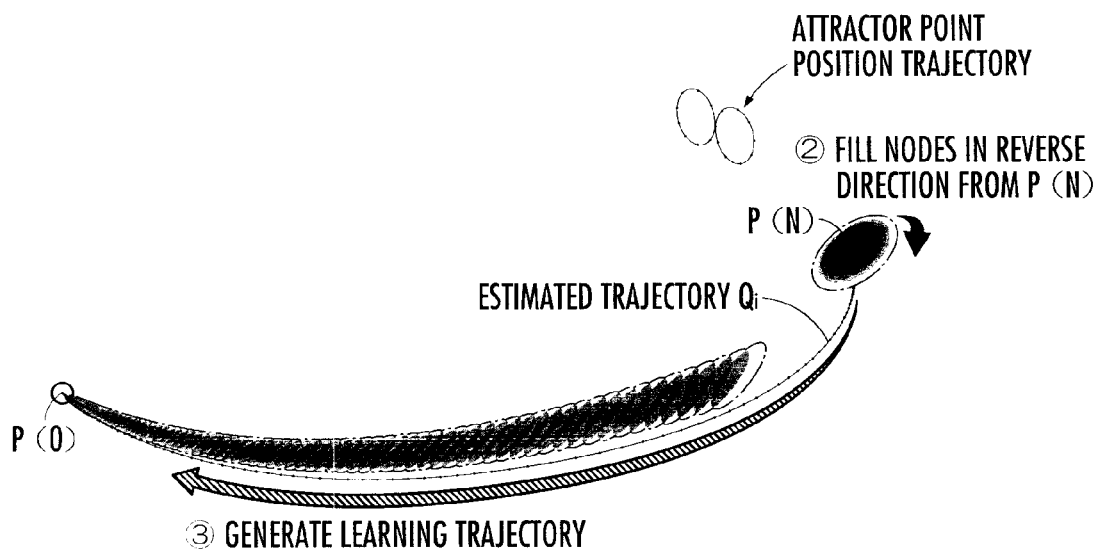

To be specific, as illustrated in FIG. 8(a), the estimated positions $p^+(0)(=p(0))$, $p^+(1)$, $p^+(2)$, ..., $p^+(N)$ of the second state variable are sequentially estimated in the forward direction in a time series manner (refer to the white arrow) from the first reference point t=0 to the second reference point t=N. Thus, the trajectory that goes through the estimated positions $p^+(0)$, $p^+(1)$, $p^+(2)$, ..., $p^+(N)$ of the second state variable in order is generated as the estimated trajectory in the forward direction. Further, as illustrated in FIG. 8(a), the estimated positions $p^-(N)(=p(N))$, $p^-(N-1)$, $p^-(N-2)$, ..., $p^-(0)$ of the second state variable are estimated in the reverse direction in a time series manner (refer to the black arrow) from the second reference point t=N to the first reference point t=0. Thus, the trajectory that goes through the estimated positions $p^-(N)$, $p^-(N-1)$, $p^-(N-2)$, ..., $p^-(0)$ of the second state variable in order is generated as the estimated trajectory in the reverse direction.

Further, as illustrated in FIG. 8(b), the probability distribution around the points $p^+(0)$, $p^+(1)$, $p^+(2)$, ..., $p^+(N)$ of the estimated trajectory in the forward direction (refer to the third term of the right side of relational expression (21)) and the probability distribution around the points $p^-(N)$, $p^-(N-1)$, $p^-(N-2)$, ..., $p^-(0)$ of the estimated trajectory in the reverse direction are superimposed or combined to set a resultant permissible passing range. Then, as indicated by the hatched arrow, the learning trajectory P is generated such that the position of the second state variable falls within the resultant permissible passing range at each point. As indicated by the chain line in FIG. 8(a), a permissible passing range (probability distribution range) expands around the individual points of the estimated trajectory in the forward direction (refer to FIG. 7(a)). As indicated by the two-dot chain line in FIG. 8(a), a permissible passing range (probability distribution range) expands around the individual points of the estimated trajectory in the reverse direction (refer to FIG. 7(b)). The degree of the expansion of the superimposition of these probability distributions corresponds to the permissible passing range of the learning trajectory P (refer to FIG. 7(c)).

The permissible passing range in the forward direction and the permissible passing range in the reverse direction need not be always combined at every point. Instead, for example, the learning trajectory P may be generated by generating a first partial trajectory that passes the permissible passing range in the forward direction for a first period t=0 to k and a second partial trajectory that passes the permissible passing range in the reverse direction for a second period t=k+1 to N following the first period, and then by smoothly connecting the first partial trajectory and the second partial trajectory. Further alternatively, the learning trajectory P may be generated by generating a first partial trajectory which passes the permissible passing range in the forward direction for the first period t=0 to k, a second partial trajectory which passes the permissible passing range in the reverse direction for a second period t=k+c (c>1) to N after the first period, an intermediate partial trajectory for a period of t=k+1 to k+c−1 for smoothly connecting the first partial trajectory and the second partial trajectory, and then connecting the first partial trajectory, the intermediate partial trajectory, and the second partial trajectory in order.

Subsequently, the behavior control system 100 controls the motion of the robot 1 according to the learning trajectory generated by the trajectory generating element 120 (S010 in FIG. 3). To be specific, the operation of the actuator 1000 is controlled such that the position of the racket as the second state variable is displaced according to the learning trajectory P. This causes the arms 12 and the legs 14 and the like to be moved, as illustrated in FIG. 5(a) to FIG. 5(c) in order, thereby causing the robot 1 to perform the task of swinging the racket held in the hand 13.

The ratio of the scale of the learning trajectory P to the scale of the reference trajectory Q may be adjusted so as to agree with the ratio of the motion scale of the robot 1 to the motion scale of the instructor. For instance, the ratio of the length of the arm 12 of the robot 1 to the length of the arm of the instructor may be multiplied by the attractor matrix R thereby to adjust the scale of the learning trajectory P indicative of the time-series changing manner of the position of the hand 13 of the robot 1 to the scale of the reference trajectory Q indicative of the time-series changing manner of the position of the hand of the instructor. Further, the ratio of the sum of the length of the arm 12 of the robot 1 and the length of the racket used by the robot 1 to the sum of the length of the arm of the instructor and the length of the racket used by the instructor may be multiplied by the attractor matrix $R_i$ thereby to adjust the scale of the learning trajectory P indicative of the time-series changing manner of the position of the racket held by the robot 1 to the scale of the reference trajectory Q indicative of the time-series changing manner of the position of the racket held by the instructor.

Figure 9:
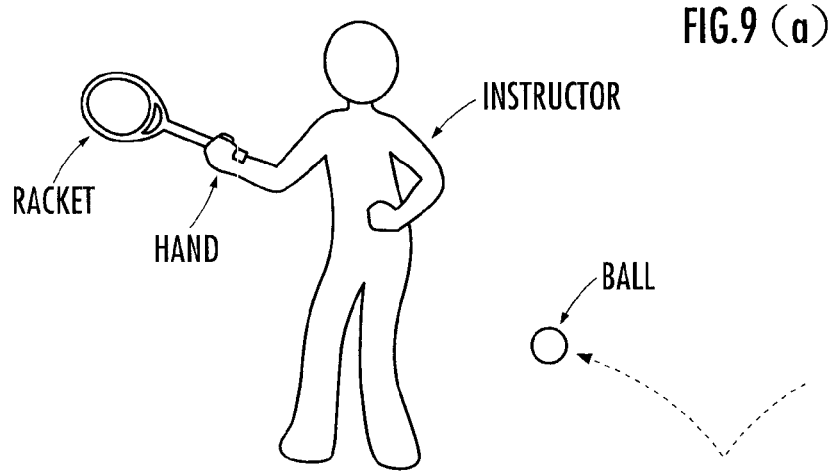
FIG. 9(a) to FIG. 9(c) are graphical illustrations of motions of an instructor in a second embodiment.
Figure 9:
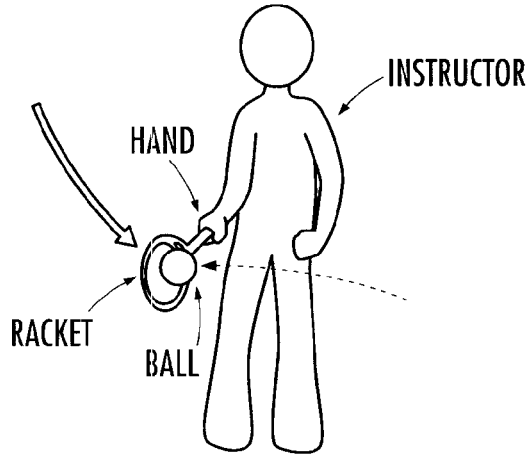
Figure 9:
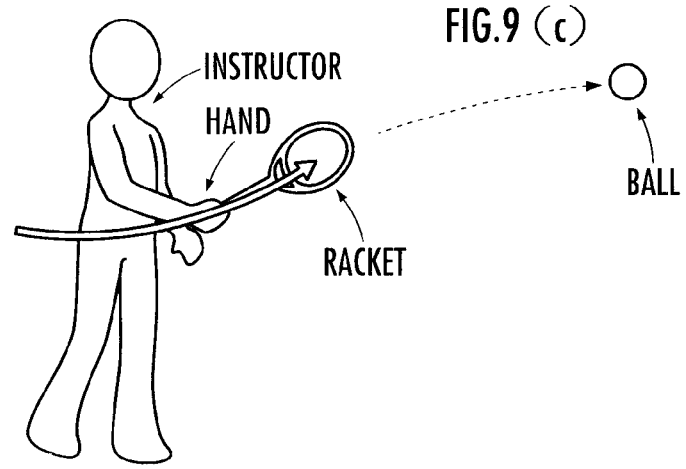
Figure 10:
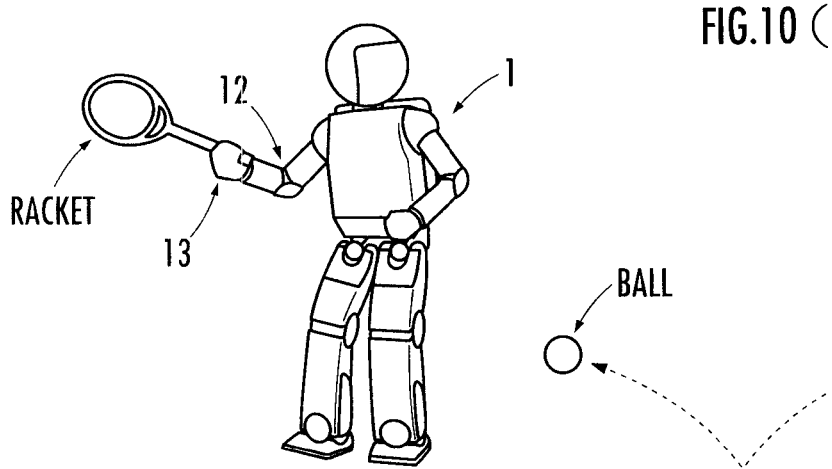
FIG. 10(a) to FIG. 10(c) are graphical illustrations of motions of a robot in the second embodiment.
Figure 10:
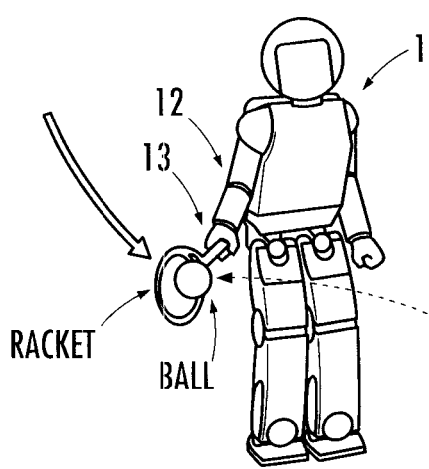
Figure 10:
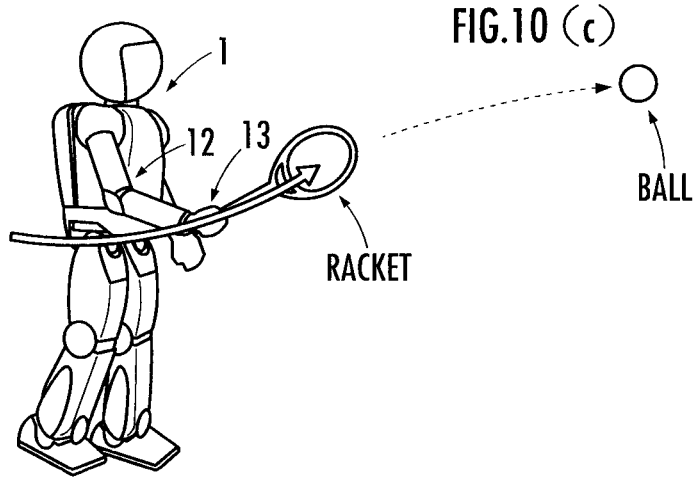

A behavior control system 100 as a second embodiment of the present invention will now be described. The behavior control system 100 according to the second embodiment controls the behavior of the robot 1, which is an agent, so as to cause the robot 1 to emulate the same task carried out by a human being, who is an instructor. Here, the instructor carries out the task of hitting back a ball coming toward him/her on the forehand by using a racket held in one hand, as illustrated in FIG. 9(a) to FIG. 9(c), and the robot 1 is to carry out the same task, as illustrated in FIG. 10(a) to FIG. 10(c). FIGS. 9(a), 9(b), and 9(c) illustrate a state immediately before the instructor starts moving the racket, a state in which the ball has touched the racket, and a state in which the instructor has stopped moving the racket, respectively.

Because of the nature of the task requiring the ball be hit against the racket, the state recognizing element 110 measures the position of the first state variable and the position of the ball at the point t=h when the instructor hits the ball against the racket (refer to FIG. 9(b)) in order to recognize a reference trajectory (refer to S002 in FIG. 3). The speed change of the ball is measured by an image analysis obtained through a camera constituting a motion capture system. The point at which the speed change of the ball exceeds a threshold value is recognized as the point at which the ball is struck back by the racket. Alternatively, the point at which a microphone (not shown) detects the sound produced when the ball strikes the racket may be recognized as the point at which the ball strikes the racket.

To generate the positional trajectory of the second state variable (refer to S008 in FIG. 3), the state recognizing element 110 measures the position and the speed of the ball coming toward the robot 1 and then estimates the position of the ball when the ball hits the racket on the basis of the results of the measurement. Further, the second state variable position p (h) at an intermediate reference point t=h at which the robot 1 strikes the ball with the racket is predicted on the basis of the position at which the ball hits the racket and the correlation between the position of the first state variable and the position of the ball at the point when the instructor struck the ball with the racket. The intermediate reference point t=h may be different from the point t=h at which the instructor struck the ball with the racket. Alternatively, the intermediate reference point t=h may be uniformly set on the basis of a typical time interval between the moment the swinging of the racket begins and the moment the ball hits the racket.

Figure 11:
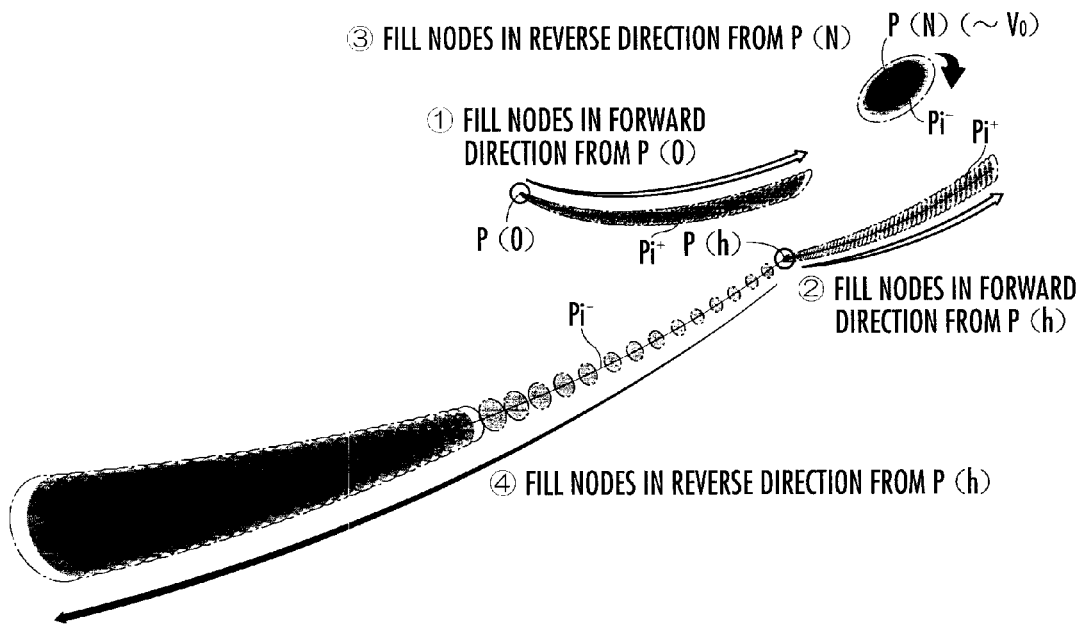
FIG. 11(a) and FIG. 11(b) are graphical illustrations of a method for generating a learning trajectory in the second embodiment.
Figure 11:
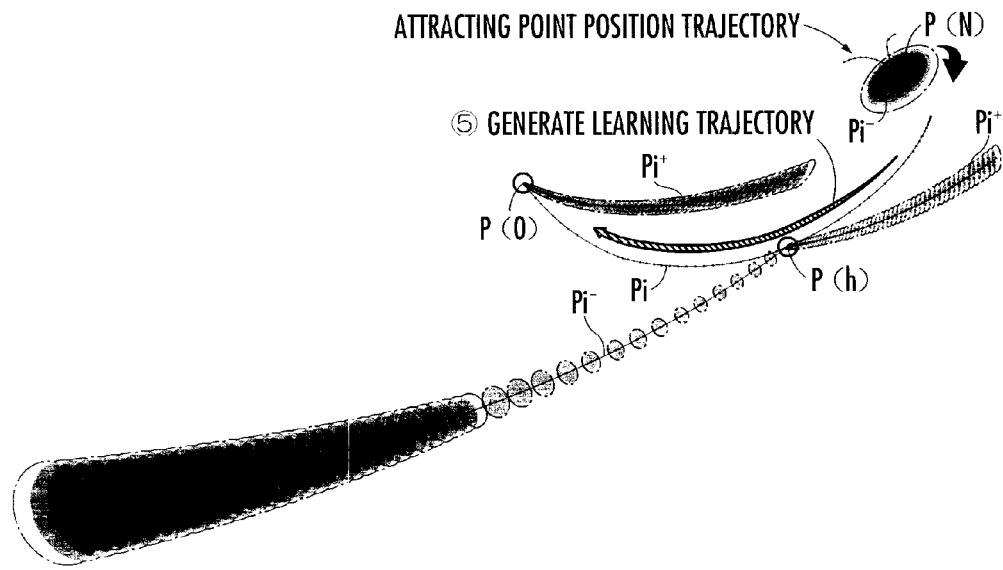

Then, the positions $p^+(0)(=p(0))$, $p^+(1)$, $p^+(2)$, ..., $p+(h-1)$ of the second state variable are sequentially estimated in the forward direction in a time-series manner (refer to the white arrow) from the first reference point t=0 to the point t=h-1 immediately before the intermediate reference point t=h, as illustrated in FIG. 11(a). Similarly, the positions $p^+(h)(=p(h))$, $p^+(h+1)$, $p^+(h+2)$, ..., $p^+(N)$ of the second state variable are sequentially estimated in the forward direction in a time-series manner (refer to the white arrow) from the intermediate reference point t=h to the second reference point t=N, as illustrated in FIG. 11(a). Thus, the trajectory that goes through the estimated positions $p^+(0)$, $p^+(1)$, ..., $p^+(h-1)$, $p^+(h)$, $p^+(h+1)$, ..., $p^+(N)$ of the second state variable in order is generated as the estimated trajectory in the forward direction.

On the other hand, as illustrated in FIG. 11(a), the positions $p^-(N)(=p(N))$, $p^-(N-1)$, $p^-(N-2)$, ..., $p^-(h+1)$ of the second state variable are sequentially estimated in the reverse direction in a time-series manner (refer to the black arrow) from the second reference point t=N to the point t=h+1 immediately after the intermediate reference point t=h. Similarly, the positions $p^-(h)(=p(h))$, $p^-(h-1)$, $p^-(h-2)$, ..., $p^-(0)$ of the second state variable are sequentially estimated in the reverse direction in a time-series manner (refer to the black arrow) from the intermediate reference point t=h to the first reference point t=0, as illustrated in FIG. 11(a). Thus, the trajectory that goes through the estimated positions $p^-(N)$, $p^-(N-1)$, ..., $p^-(h+1)$, $p^-(h)$, $p^-(h-1)$, ..., $p^-(0)$ of the second state variable in order is generated as the estimated trajectory in the reverse direction.

Then, as illustrated in FIG. 11(b), the probability distribution around the points $p^+(0)$, ..., $p^+(h-1)$, $p^+(h)$, $p^+(h+1)$, ..., $p^+(N)$ of the estimated trajectory in the forward direction and the probability distribution around the points $p^-(N)$, ..., $p^-(h+1)$, $p^-(h)$, $p^-(h-1)$, ..., $p^-(0)$ of the estimated trajectory in the reverse direction are superimposed or combined to set a resultant permissible passing range. Then, as indicated by the hatched arrow, the learning trajectory P is generated such that the position of the second state variable falls within the resultant permissible passing range at each point.

As indicated by the chain line in FIG. 11(a), a permissible passing range (probability distribution range) expands around the individual points of the estimated trajectory in the forward direction (refer to FIG. 7(a)). As indicated by the two-dot chain line in FIG. 11(a), a permissible passing range (probability distribution range) expands around the individual points of the estimated trajectory in the reverse direction (refer to FIG. 7(b)). The degree of the expansion of the superimposition of these probability distributions corresponds to the permissible passing range of the learning trajectory P (refer to FIG. 7(c)).

Then, the behavior of the robot 1 is controlled by the behavior control system 100 according to the learning trajectory generated by the trajectory generating element 120 (S010 in FIG. 3). To be specific, the operation of the actuator 1000 is controlled such that the position of the racket as the second state variable changes according to the learning trajectory. This causes the robot 1 to carry out the task of hitting the ball coming toward the robot 1 back on the forehand by using the racket held in one hand 13, as illustrated in FIG. 10(a) to FIG. 10(c) in order.

According to the behavior control system 100 in accordance with the first and the second embodiments which exhibit the functions described above, each time the instructor carries out a task a plurality of times, the reference trajectory $Q_i$ indicating the position of the first state variable in a time-series manner is recognized or measured (refer to S002 in FIG. 3, FIG. 4(a) to FIG. 4(c), and FIG. 9(a) to FIG. 9(c)). This makes it possible to generate the first model which is appropriate to be used as the basis on which a typical shape characteristic of the reference trajectory $Q_i$, that is, the characteristic of a motion of the instructor carrying out the task, is reproduced or emulated on the basis of a plurality of reference trajectories $Q_i$.

Further, the learning trajectory P, which represents the position of the second state variable in a time-series manner, is generated according to the first model and the second model. To be specific, an estimated trajectory in the forward direction which indicates, in a time-series manner, the changing manner of the estimated position of the second state variable in the forward direction in a time-series manner is generated (refer to the white arrow in FIG. 8(a) and the white arrow in FIG. 11(a)). On the other hand, an estimated trajectory in the reverse direction which indicates, in a time-series manner, the changing manner of the estimated position of the second state variable in the reverse direction in a time-series manner is generated (refer to the black arrow in FIG. 8(a) and the black arrow in FIG. 11(a)).

The first model represents a typical shape characteristic of the reference trajectory $Q_i$ which indicates, in a time-series manner, a position q of the first state variable which is displaced as the instructor moves (refer to FIG. 4(a) to FIG. 4(c) and FIG. 9(a) to FIG. 9(c)). Thus, each estimated trajectory is generated according to the first model and the learning trajectory P is generated on the basis of each estimated trajectory, thereby making it possible to impart a typical shape characteristic of the reference trajectory $Q_i$, i.e., the characteristic of a motion of the instructor carrying a task, to the learning trajectory P (refer to FIG. 5(a) to FIG. 5(c) and FIG. 10(a) to FIG. 10(c)).

The second model represents the position p of the second state variable corresponding to the first state variable and a motion of the agent in which one or a plurality of n-th order time differential values (n=1, 2, . . . ) continuously changes (refer to FIG. 6). Thus, each estimated trajectory is generated according to the second model, making it possible to impart a displacement characteristic, in which the position p of the second state variable and one or a plurality of n-th order time differential values (first-order time differential values (displacing velocity v) and the second-order time differential values (acceleration α) in the embodiments described above) continuously changes, to the estimated trajectories in the forward direction and the reverse direction, respectively.

Further, the learning trajectory P is generated (refer to the hatched arrow in FIG. 8(b) and the hatched arrow in FIG. 11(b)) such that the position p of the second state variable at each point falls within the resultant permissible passing range, which has been obtained by combining the permissible passing range which expands, using the estimated trajectory in the forward direction as the reference thereof (refer to the chain line in FIG. 8(b) and the chain line in FIG. 11(b)), and the permissible passing range which expands, using the estimated trajectory in the reverse direction as the reference thereof (refer to the two-dot chain line in FIG. 8(b) and the two-dot chain line in FIG. 11(b)). In other words, the learning trajectory P is generated, allowing a certain degree of fluctuation or stagger defined by the breadth of the resultant permissible passing range.

For a point at which the need for the learning trajectory P to track the reference trajectory $Q_i$ is higher to cause the agent to carry out a task, the permissible passing range of the position p of the second state variable at that point is set to be narrower or smaller.

For example, in the first embodiment, the permissible passing range of the learning trajectory P at t=0 (refer to FIG. 4(a)) is set to be zero or sufficiently narrow or small, whereas the permissible passing ranges at other points are set to be wider or larger to a certain extent by the expansions of the probability distributions determined by stochastic transition models (refer to FIGS. 8(a) and 8(b)).

In the second embodiment, the permissible passing ranges of the learning trajectory P at t=0 (refer to FIG. 9(a)) and the point t=h when the ball hits the racket (refer to FIG. 9(b)) are set to be zero or sufficiently narrow or small, whereas the permissible passing ranges at other points are set to be wider or larger to a certain extent by the expansions of the probability distributions determined by stochastic transition models (refer to FIGS. 11(a) and 11(b)). The flexible adjustment of the breadth of the permissible passing ranges is possible, because fluctuations or displacements of the attracting point u of the attractor R are allowed (refer to relational expression (12)).

As described above, the breadth or magnitude of the permissible passing range is set for the agent to perform a task, thus making it possible to generate an appropriate learning trajectory for the robot 1 to carry out the task while reflecting a motion characteristic of the instructor thereon. This in turn makes it possible to provide the learning trajectory P with a displacement characteristic of the position p of the second state variable which is continuous to an extent required to achieve a smooth motion of the robot 1 under a condition that the learning trajectory P be provided with a typical shape characteristic of a reference trajectory in each of the forward direction and the reverse direction in a time-series manner to an extent required to carry out the task.

Thus, the learning trajectory P is generated such that the position p of the second state variable at each point falls within the permissible passing range thereof, i.e., by allowing a certain degree of fluctuation or stagger defined by the breadth of a permissible passing range. This arrangement makes it possible to provide the learning trajectory P with a displacement characteristic of the position of the second state variable which is continuous to an extent required to achieve a smooth motion of an agent under a condition that the learning trajectory P be provided with a typical shape characteristic of a reference trajectory (refer to FIGS. 4(a) to 4(c) and FIGS. 9(a) to 9(c)) to an extent required to carry out a task (refer to FIGS. 5(a) to 5(c)).

For example, in the second embodiment, the attracting point significantly changes before the ball hits the racket (t=0 to h−1) and after the ball hits the racket (t=h to N), thus allowing the estimated position trajectory of the second state variable to be discontinuous, as illustrated in FIG. 11(a). Thus, it is possible to provide the learning trajectory P with the displacement characteristic of the second state variable which is continuous to a degree required to achieve smooth motions of the robot 1 even under a restrictive condition related to a spatial trajectory that the robot 1 need to move to hit the ball against the racket (refer to FIG. 11(b)).

Hence, the behavior of the agent is controlled according to the learning trajectory P, thus enabling the robot 1 acting as the agent to carry out the task by a smooth motion which does not cause discontinuity in the time differential values of the second state variable while having the robot 1 emulate or reproduce a motion characteristic of the instructor (refer to FIG. 5(a) to FIG. 5(c) and FIG. 10(a) to FIG. 10(c)).

Figure 12:
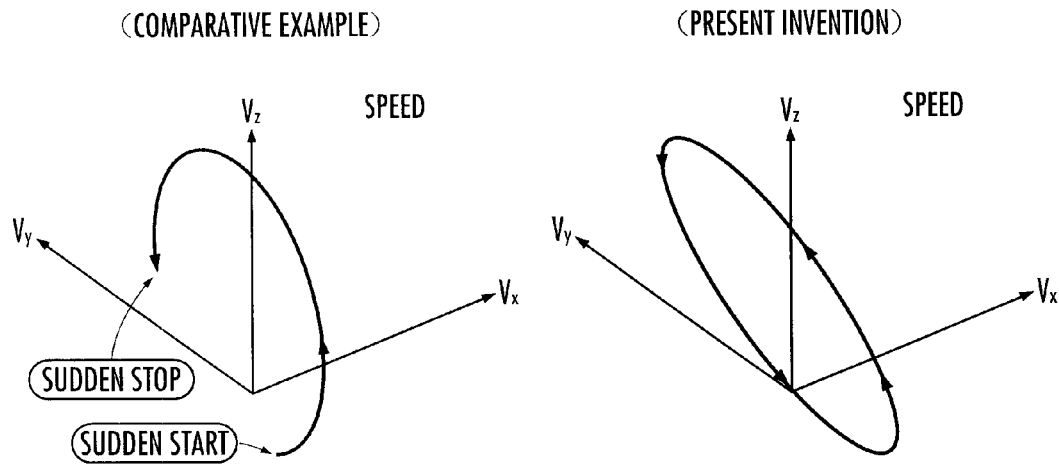
FIG. 12(a) and FIG. 12(b) are graphical illustrations of advantages of the behavior control system in accordance with the present invention.
Figure 12:
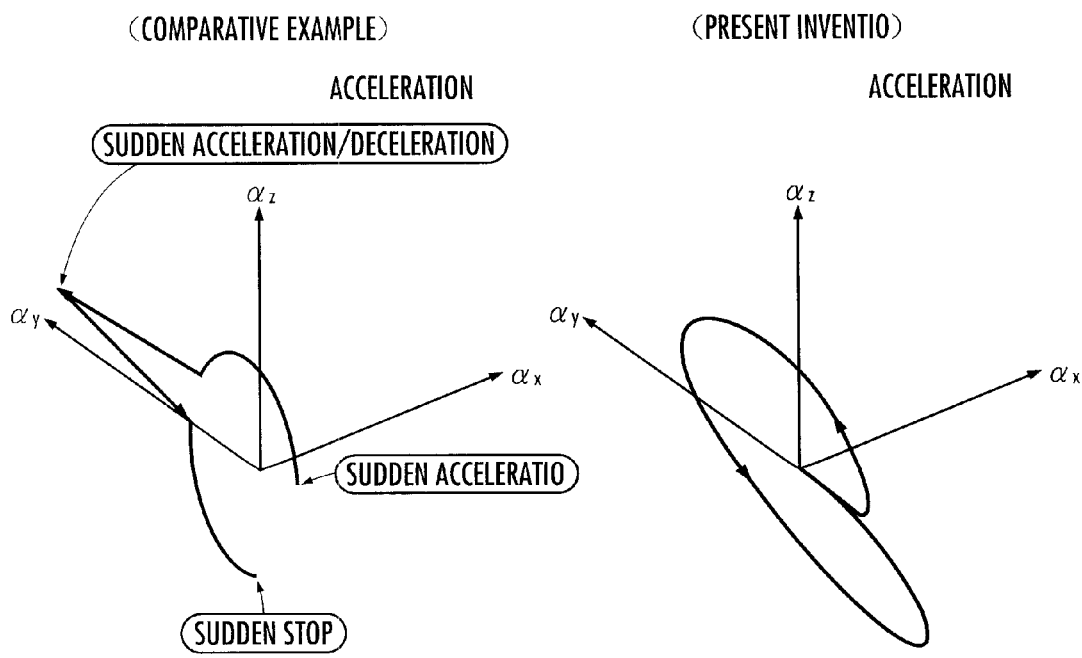

As a comparative example, a case will be considered where the learning trajectory P is generated by omitting the nodes of the acceleration α and the jerk β in the DBN given in FIG. 6. According to the comparative example, the learning trajectory P in which the displacing velocity v and the acceleration α of the racket position p as the second state variable become temporarily discontinuous is generated, as illustrated at left in FIG. 12(a) and FIG. 12(b). Hence, when the robot 1 moves the arm 12 and the like according to the generated learning trajectory P, the robot 1 exhibits unsmooth motions, such as a sudden change in the moving speed of the arm 12 and the leg 14. In contrast thereto, the behavior control system in accordance with the present invention generates the learning trajectory P in which the displacing velocity v and the acceleration α of the racket position p as the second state variable are continuous, as illustrated at right in FIG. 12(a) and FIG. 12(b). This enables the robot 1 to carry out the task by smoothly moving the arm 12 and the leg 14 according to the learning trajectory.

A behavior model having different properties may be defined along the way by attractors R having different properties. For example, in the second embodiment, the first model and also the stochastic transition model may be defined by a first attractor $R_1$ before the robot 1 hits the ball with the racket and by a second attractor $R_2$ after the robot 1 hits the ball, the first attractor $R_1$ and the second attractor $R_2$ have different properties (refer to FIG. 6). Further, the first attractor $R_1$ may be defined to exhibit the property of a motion for swinging the racket with a high momentum, while the second attractor $R_2$ may be defined to exhibit the property of a motion for swinging the racket with a low momentum. Thus, the balance between the typical shape characteristic of the reference trajectory $Q_i$ of the learning trajectory P and the displacing characteristic of continuous second state variable can be adjusted. This enables the robot 1 to carry out a task by achieving smoothly connected behaviors having different properties, such as different levels of trackability to a reference trajectory required of the second state variable.

Further, the robot 1 may carry out a variety of tasks, including a dance which involves the motions of the arms 12 and the legs 14 and carrying an object, in addition to the task of swinging a racket or hitting a ball back with a racket, by emulating the motion of an instructor.

What is claimed is:

1. A behavior control system for causing an agent to carry out a task by emulating a behavior taken by an instructor to carry out the task, comprising:
a trajectory generating element which generates a learning trajectory indicating a position of a second state variable in a time-series manner on a basis of a first model which represents a typical shape characteristic of a reference trajectory indicating, in a time-series manner, a position of a first state variable which is displaced with a motion of the instructor, and a second model which represents a motion of the agent in which the position and one or a plurality of n-th order time differential values (n=1, 2, . . . ) of the second state variable corresponding to the first state variable continuously change,
wherein the motion of the agent is controlled according to the learning trajectory generated by the trajectory generating element.

2. The behavior control system according to claim 1, wherein
the trajectory generating element generates an estimated trajectory which indicates an estimated position of the second state variable at each point according to the first model and the second model, sets a permissible passing range of the position of the second state variable at each point on a basis of the estimated trajectory, and generates the learning trajectory such that the position of the second state variable at each point falls within the permissible passing range at the each point.

3. The behavior control system according to claim 2, wherein
the trajectory generating element sets the permissible passing range such that the permissible passing range of the position of the second state variable at a reference point requiring higher need for tracking the reference trajectory to cause the agent carry out the task is set to be narrower or smaller.

4. The behavior control system according to claim 2, wherein
the trajectory generating element estimates the position of the second state variable at each point in a forward direction in a time-series manner thereby to generate the estimated trajectory in the forward direction, estimates the position of the second state variable at each point in a reverse direction in a time-series manner thereby to generate the estimated trajectory in the reverse direction, and generates the learning trajectory such that the value of the second state variable at each point falls within a resultant permissible passing range obtained by combining the permissible passing range of the estimated trajectory in the forward direction and the permissible passing range of the estimated trajectory in the reverse direction.

5. The behavior control system according to claim 1, wherein
the trajectory generating element defines the first model such that the properties of the first model change along the way.

6. The behavior control system according to claim 1, comprising:
a state recognizing element which recognizes a reference trajectory indicating the position of the first state variable in a time-series manner,
wherein the trajectory generating element defines the first model on a basis of a plurality of the reference trajectories recognized by the state recognizing element each time the instructor carries out the task.

7. The behavior control system according to claim 1, wherein
the trajectory generating element defines an attractor on a basis of the reference trajectory and defines the first model indicating a typical shape of the reference trajectory on a basis of the attractor.

8. The behavior control system according to claim 7, wherein the trajectory generating element displaces an attracting point of the attractor according to the progress of carrying out the task.

* * * * *